United States Patent
Tao et al.

(10) Patent No.: US 10,906,753 B1
(45) Date of Patent: Feb. 2, 2021

(54) CYCLIC TYPE LAYERED STORAGE AND OUTPUT EQUIPMENT

(71) Applicant: TCTM (HONG KONG) LIMITED, Hong Kong (CN)

(72) Inventors: Chia-Li Tao, Hong Kong (CN); Chien-Hung Fan, Hong Kong (CN)

(73) Assignee: TCTM (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 16/748,677

(22) Filed: Jan. 21, 2020

(51) Int. Cl.
*B65G 47/90* (2006.01)
*B65G 1/02* (2006.01)
*B65G 1/127* (2006.01)
*B65G 47/64* (2006.01)
*B65G 37/02* (2006.01)

(52) U.S. Cl.
CPC .............. *B65G 47/90* (2013.01); *B65G 1/02* (2013.01); *B65G 1/127* (2013.01); *B65G 37/02* (2013.01); *B65G 47/643* (2013.01)

(58) Field of Classification Search
CPC .......... B65G 47/90; B65G 1/02; B65G 1/127; B65G 1/06; B65G 47/643; B65G 1/026; B65G 1/0485; B65G 1/0492; B65G 47/5154; B65G 47/5186; B65G 37/02
See application file for complete search history.

(56) References Cited

U.S. PATENT DOCUMENTS

| | | | | |
|---|---|---|---|---|
| 3,734,264 A | * | 5/1973 | Stumpf | B65G 1/06 198/347.4 |
| 3,967,740 A | * | 7/1976 | Molins | B65G 1/127 414/331.13 |
| 4,239,436 A | * | 12/1980 | Wildenaur | B65G 1/06 198/766 |
| 2006/0201785 A1 | * | 9/2006 | Moeller | B65G 1/127 198/618 |
| 2014/0110192 A1 | * | 4/2014 | Yoshioka | B65G 1/0407 182/82 |
| 2016/0221756 A1 | * | 8/2016 | Davi | A23G 7/0037 |
| 2017/0101264 A1 | * | 4/2017 | Brumm | B60L 5/40 |
| 2018/0111758 A1 | * | 4/2018 | Cheng | B65G 1/137 |

FOREIGN PATENT DOCUMENTS

EP 2620392 B1 * 12/2014 ......... B65G 47/5109

* cited by examiner

Primary Examiner — Mark A Deuble

(57) ABSTRACT

A cyclic type layered storage and output equipment includes a first pick-and-place device and a second pick-and-place device set at two opposite sides of an automatic material distribution and storage machine for delivering drill bits for detection and storing the detected drill bits by using horizontal transportation and layered storage technology. It can reduce the equipment space. After the overall inspection is completed, all the stored drill bits are transferred to another processing equipment together.

6 Claims, 9 Drawing Sheets

CYCLIC TYPE LAYERED STORAGE AND OUTPUT EQUIPMENT

BACKGROUND OF THE INVENTION

1. Field of the Invention

The present invention relates to storage and output equipment and more particularly, to a cyclic type layered storage and output equipment, which is used for storing multiple trays, allowing the trays to be moved up and down in a cycle.

2. Description of the Related Art

The drill bits used for processing materials are too small to distinguish the size of the bits directly with the naked eye. Therefore, after use, all kinds of drill bits of different sizes are directly placed in the same box. When the drill bits need to be classified by size, they are manually placed in an identification device for identification, and the identified drill bits are classified and separately stored. Therefore, multiple storage boxes must be placed on the side of the identification device at the same time for the identification device to place different sizes of drill bits. The current method is to set a conveyor belt on the side of the identification device to place the storage boxes. This method has the following drawbacks.

1. The larger the number of sizes of the drill bits, the more the storage boxes, and the conveyor belt must retain the space for the back and forth displacement of the storage boxes, resulting in the conveyor belt occupying a very large space.

2. When some of the storage boxes are full, the conveyor belt cannot be controlled to output these storage boxes that are fully filled with drill bits, and the conveyor belt can start the delivery only after all the storage boxes have been, fully filled with drill bits, causing inconvenience in use.

SUMMARY OF THE INVENTION

The present invention has been accomplished under the circumstances in view. It is therefore the main object of the present invention to provide a cyclic type layered storage and output equipment, which adopts horizontal transportation and layered storage technology to provide classified storage of drill bits, thereby reducing equipment installation space and allowing individual output of filled trays.

To achieve this and other objects of the present invention, a cyclic type layered storage and output equipment comprises an equipment body, at least one first pick-and-place device and at least one second pick-and-place device.

The equipment body comprises a first conveyor module and a second conveyor module. The first conveyor module is used to convey at least one tray. The first conveyor module conveys the at least one tray in a first direction for detection. The second conveyor module conveys the at least one tray in a second direction for storage. The first conveyor module and the second conveyor module are arranged above and below at different elevations. The first direction and the second direction are opposite directions.

The at least one first pick-and-place device is set on one lateral side of the equipment body. Each first pick-and-place device comprises a first fixed seat, a first movable seat and a first linear actuator. The first fixed seat is affixed to one lateral side of the equipment body. The first fixed seat and the first movable seat are connected by the first linear actuator. The first linear actuator drives the first movable seat to move linearly relative to the first fixed seat. The first movable seat comprises a first position and a second position. The first position corresponds to a second discharge end of the second conveyor module. The second position corresponds to a first feeding end of the first conveyor module.

The at least one second pick-and-place device is set on the other lateral side of the equipment body opposite to the first pick-and-place device. Each second pick-and-place device comprises a second fixed seat, a second movable seat and a second linear actuator. The second fixed seat is affixed to the other lateral side of the equipment body opposite to the at least one first pick-and-place device. The second fixed seat and the second movable seat are connected by the second linear actuator. The second linear actuator drives the second movable seat to move linearly relative to the second fixed seat. The second movable seat comprises a third position and a fourth position. The third position corresponds to a first discharge end of the first conveyor module. The fourth position corresponds to a second feeding end of the second conveyor module.

Through the above description, the application of the present invention is as follows: Before use, multiple trays are discharged from the second discharge end of the second conveyor module. In this state, the first movable seat of the first pick-and-place device moves to the first position, and then the first linear actuator moves the first movable seat to the second position, and then the first conveyor module conveys the tray to a detection device for detection, or uses a clamping device to place drill bits in the tray, and then the tray is discharged from the first discharge end of the first conveyor module to the second movable seat of the second pick-and-place device. The second movable seat is in the third position. The second linear actuator is used to move the second movable seat downward to the fourth position, and then the tray is stored by the second feeding end of the second conveyor module.

DETAILED DESCRIPTION OF THE PREFERRED EMBODIMENT

Figure 1:
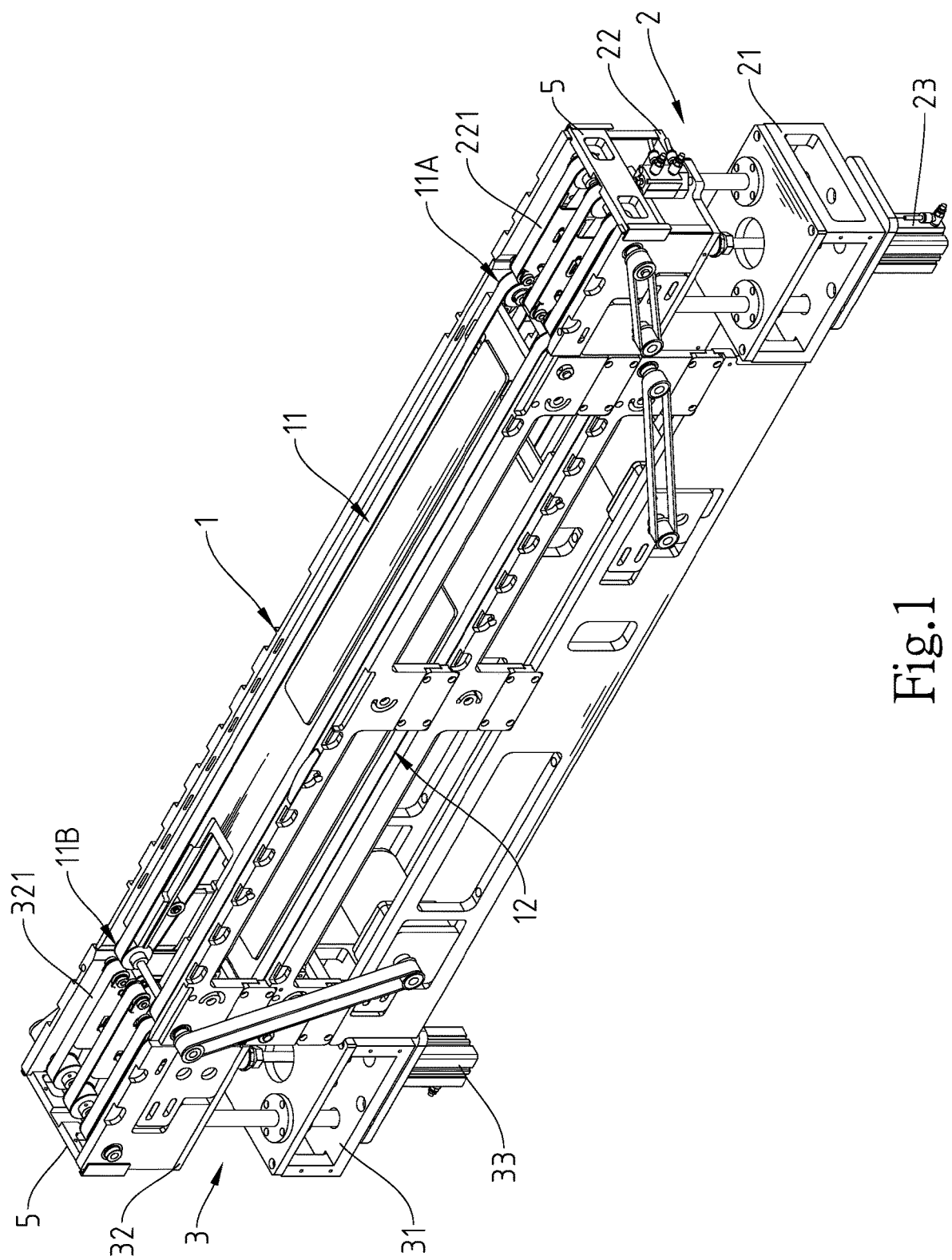
FIG. 1 is an elevational view of a cyclic type layered storage and output equipment in accordance with the present invention.
Figure 2:
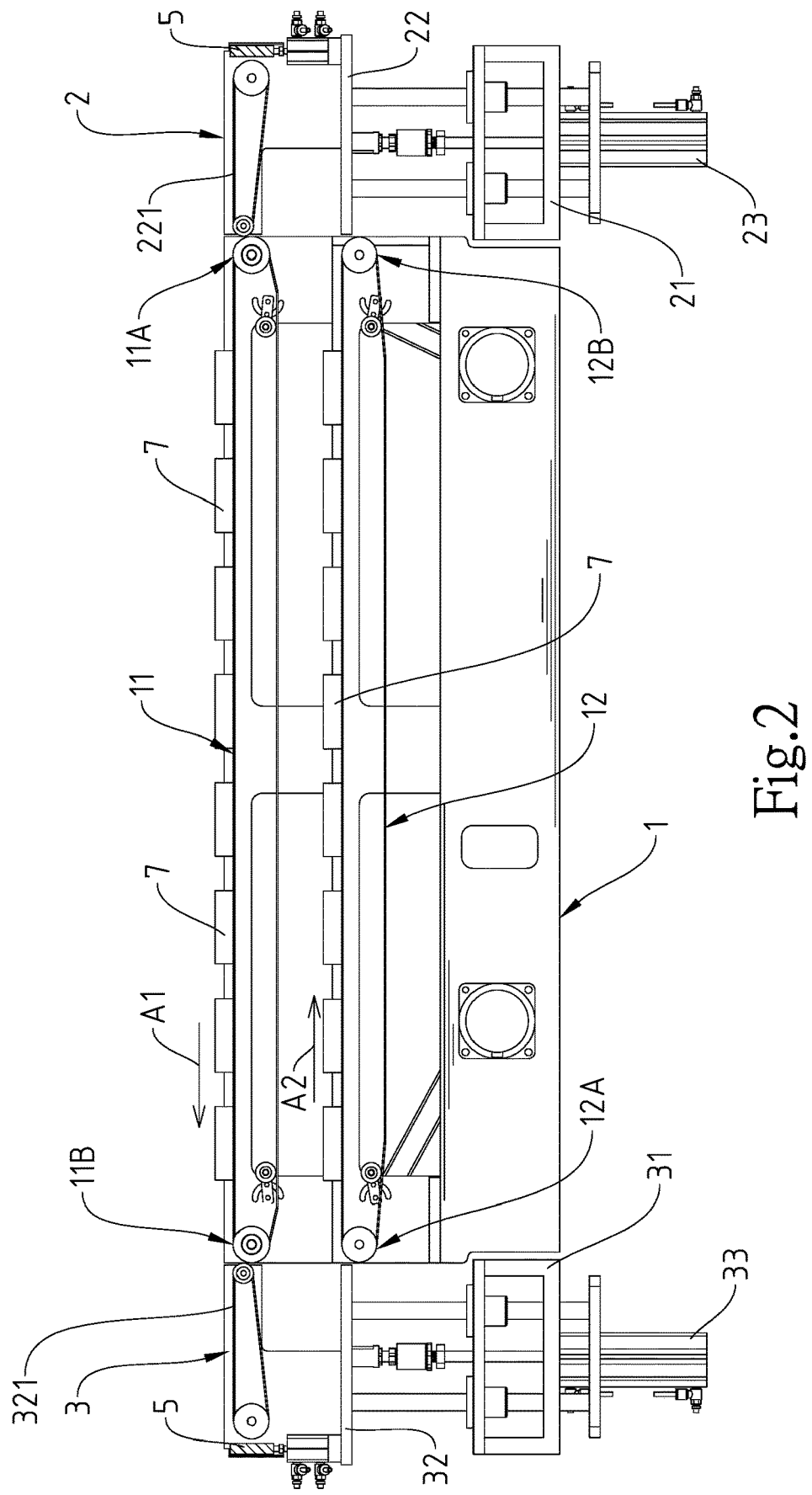
FIG. 2 is a front view of the cyclic type layered storage and output equipment in accordance with the present invention.
Figure 3:
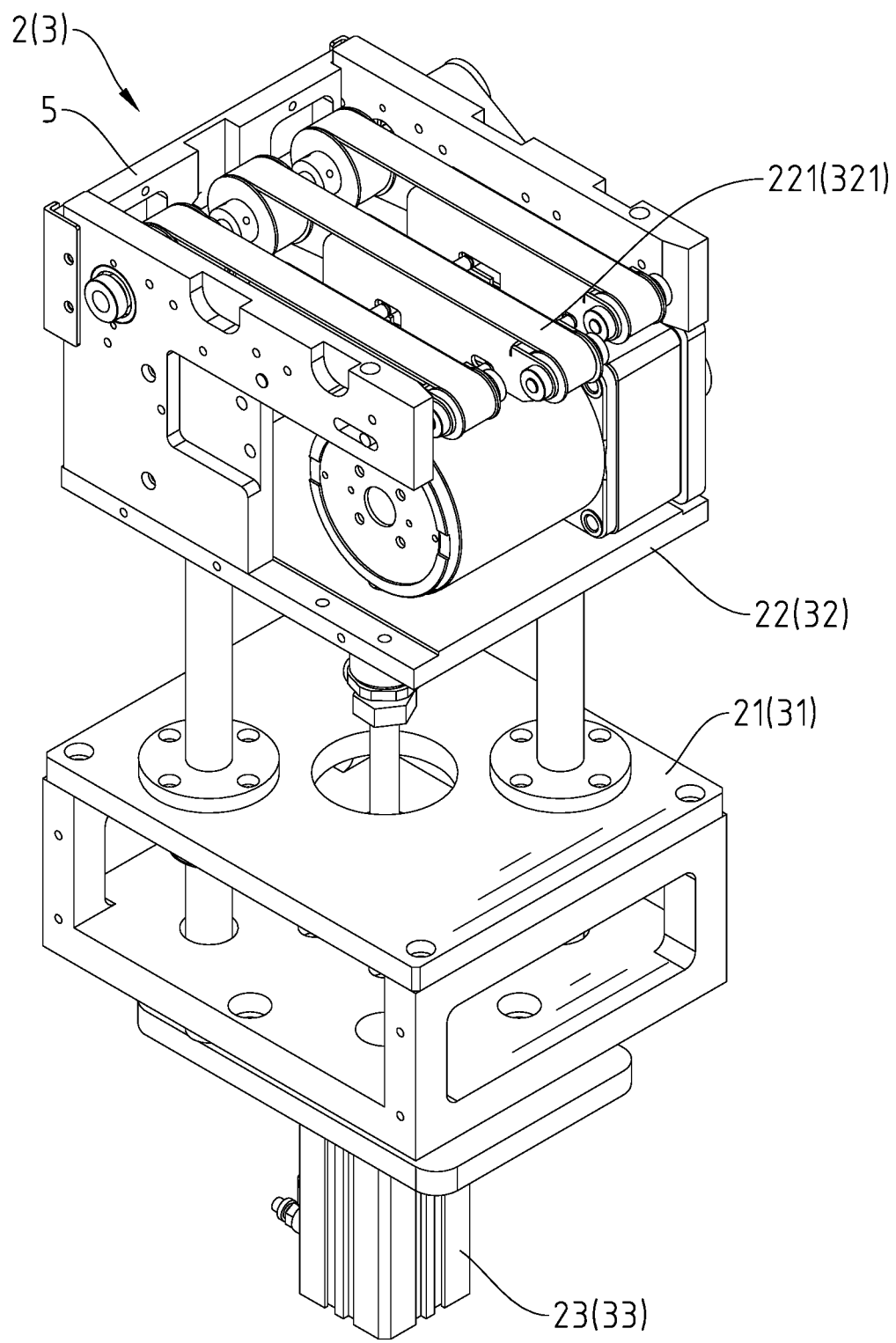
FIG. 3 is an elevational view of a first pick-and-place device/second pick-and-place device.

Referring to FIGS. 1-3, a cyclic type layered storage and output equipment in accordance with the present invention generally comprises an equipment body (1), at least one first pick-and-place device (2) and at least one second pick-and-place device (3).

As shown in FIGS. 1 and 2, the equipment body (1) comprises a first conveyor module (11) and a second conveyor module (12). The first conveyor module (11) is used to deliver at least one tray (7). Furthermore, the first conveyor module (11) delivers the at least one tray (7) in a first direction (A1) for detection, and the second conveyor module (12) delivers the at least one tray (7) in a second direction (A2) for storage. Furthermore, the first conveyor module (11) and the second conveyor module (12) are arranged above and below at different elevations, and the first direction (A1) and the second direction (A2) are opposite transportation directions. In the present preferred embodiment, the first conveyor module (11) and the second conveyor module (12) commonly use a conventional conveyor belt to deliver the at least one tray (7).

Referring to FIGS. 5-8 again, the first pick-and-place device (2) is set on one lateral side of the equipment body (1). The first pick-and-place device (2) comprises a first fixed seat (21), a first movable seat (22), a first linear actuator (23).

The first fixed seat (21) is affixed to one lateral side of the equipment body (1). The first fixed seat (21) and the first movable seat (22) are connected by the first linear actuator (23). The first linear actuator (23) drives the first movable seat (22) to move linearly relative to the first fixed seat (21). Furthermore, the first movable seat (22) comprises a first position (1A) and a second position (1B). The first position (1A) corresponds to a second discharge end (12B) of the second conveyor module (12). The second position (1B) corresponds to a first feeding end (11A) of the first conveyor module (11). As shown in FIG. 3, in order to facilitate delivering the at least one tray (7), the first movable seat (22) is provided with a conveyor module (221).

Referring to FIGS. 5-8 again, the second pick-and-place device (3) and the first pick-and-place device (2) are the same mechanism. The difference is only the installation position in the equipment body (1) and the transport direction. As illustrated in FIGS. 1-3, the second pick-and-place device (3) is set on the other lateral side of the equipment body (1) opposite to the first pick-and-place device (11). The second pick-and-place device (3) comprises a second fixed seat (31), a second movable seat (32) and a second linear actuator (33). The second fixed seat (31) is affixed to the other lateral side of the equipment body (1) opposite to the first pick-and-place device (2). The second fixed seat (31) and the second movable seat (32) are connected by the second linear actuator (33). The second linear actuator (33) drives the second movable seat (32) to move linearly relative to the second fixed seat (31). Furthermore, the second movable seat (32) comprises a third position (2A) and a fourth position (2B). The third position (2A) corresponds to a first discharge end (11B) of the first conveyor module (11). The fourth position (2B) corresponds to a second feeding end (12A) of the second conveyor module (12). As shown in FIG. 3, the second movable seat (32) is also provided with a conveyor module (321).

As shown in FIG. 3, in the present preferred embodiment, the first linear actuator (23) and the second linear actuator (33) are hydraulic cylinders. However, step motor or the like can be used as a substitute to drive the first movable seat (22) or the second movable seat (32) to move linearly.

Figure 4:
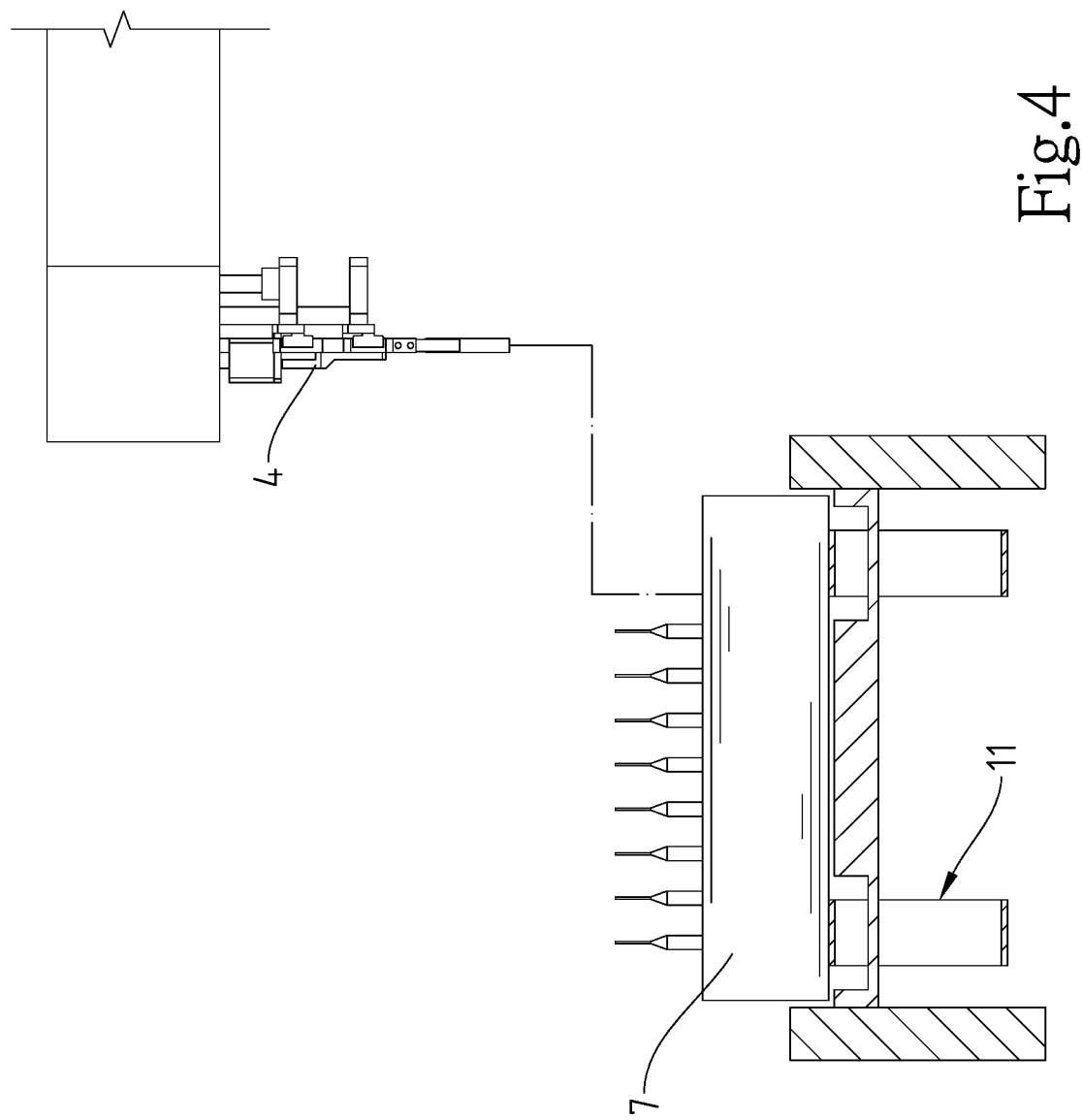
FIG. 4 is a schematic drawing showing a tray detection operation of the detection device.

Referring to FIG. 4, in actual application, the main function of the present invention is to guide the at least one tray (7) for detection and to store the at least one tray (7). As shown in FIG. 4, the tray (7) has multiple drill bits placed therein. The first conveyor module (11) delivers the tray (7) to a detection device (4), which detects the size and appearance of the drill bits or uses a clamping device to place drill bits in the tray (7).

Figure 5:
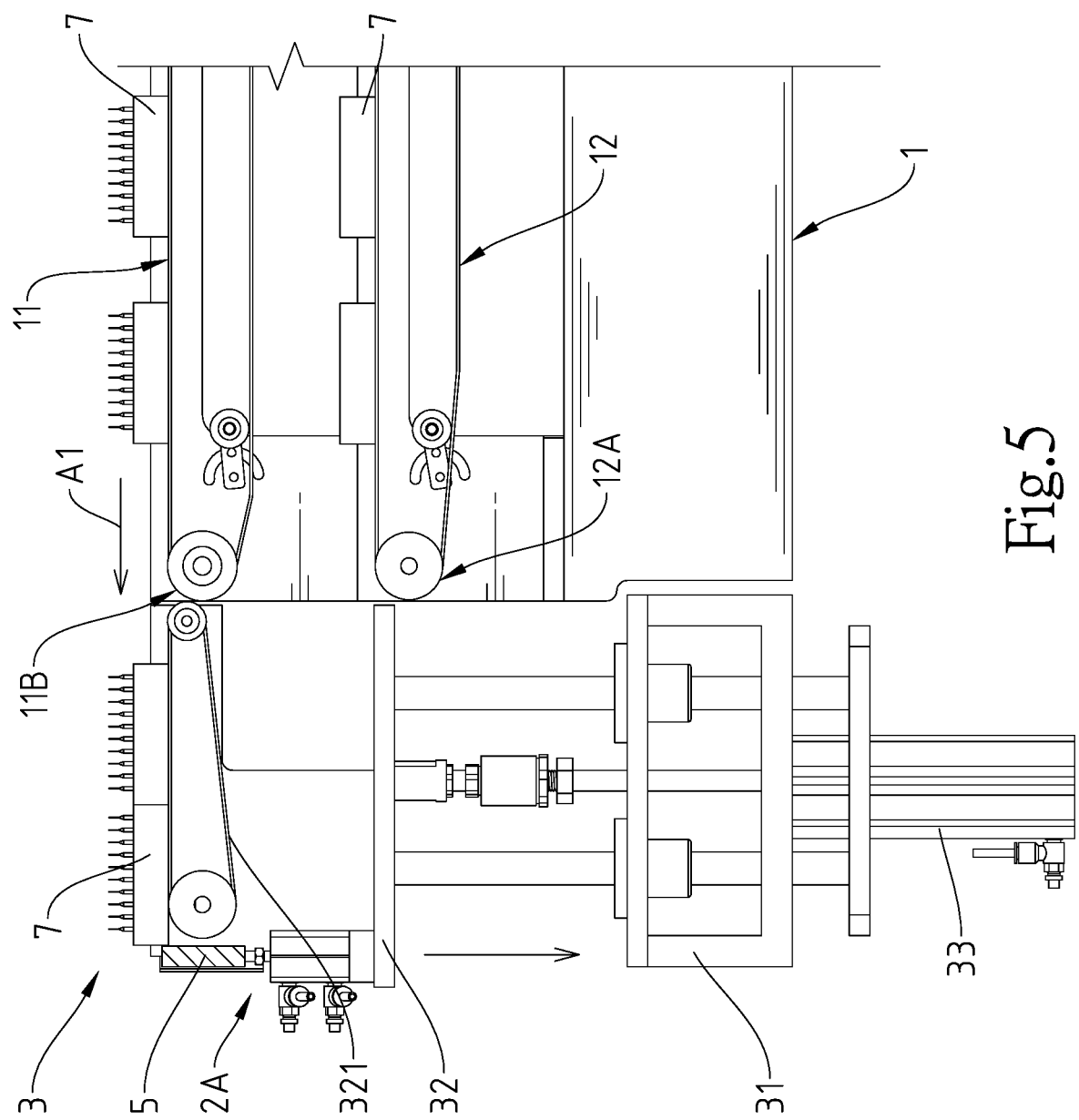
FIG. 5 is a schematic drawing showing the first conveyor module delivered the trays to the second pick-and-place device.

Referring to FIG. 5, the first conveyor module (11) delivers the detected tray (7) toward the first direction (A1), allowing the tray (7) to be delivered through the first discharge end (11B) of the first conveyor module (11) to the second movable seat (32) of the second pick-and-place device (3). The second movable seat (32) is in the third position (2A).

Figure 6:
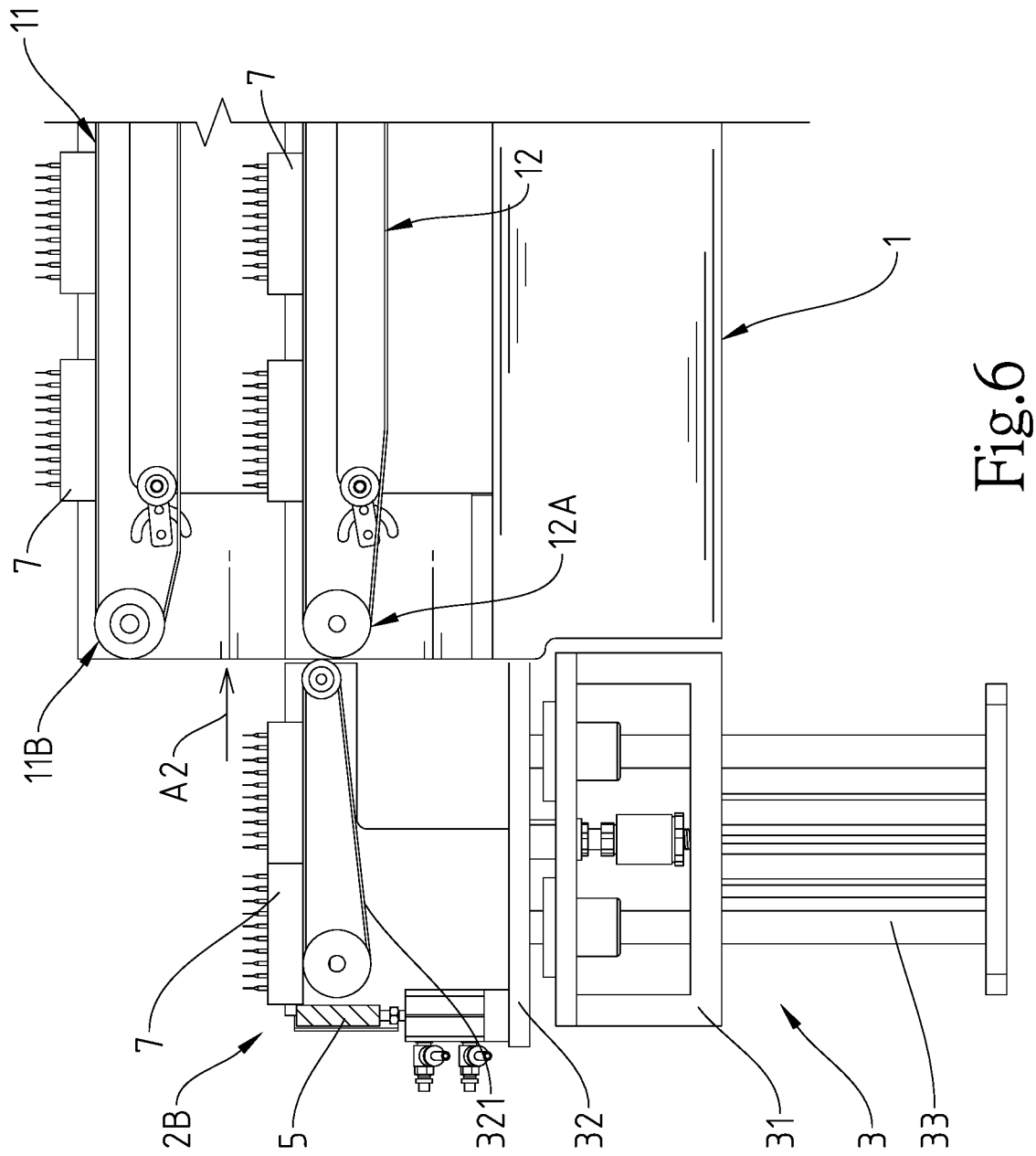
FIG. 6 is a schematic drawing showing the second pick-and-place device delivered the trays to the second conveyor module.

Referring to FIG. 6, the second linear actuator (33) moves the second movable seat (32) downwardly to the fourth position (2B), enabling the tray (7) to be stored by the second feeding end (12A) of the second conveyor module (12) tray (7).

Figure 7:
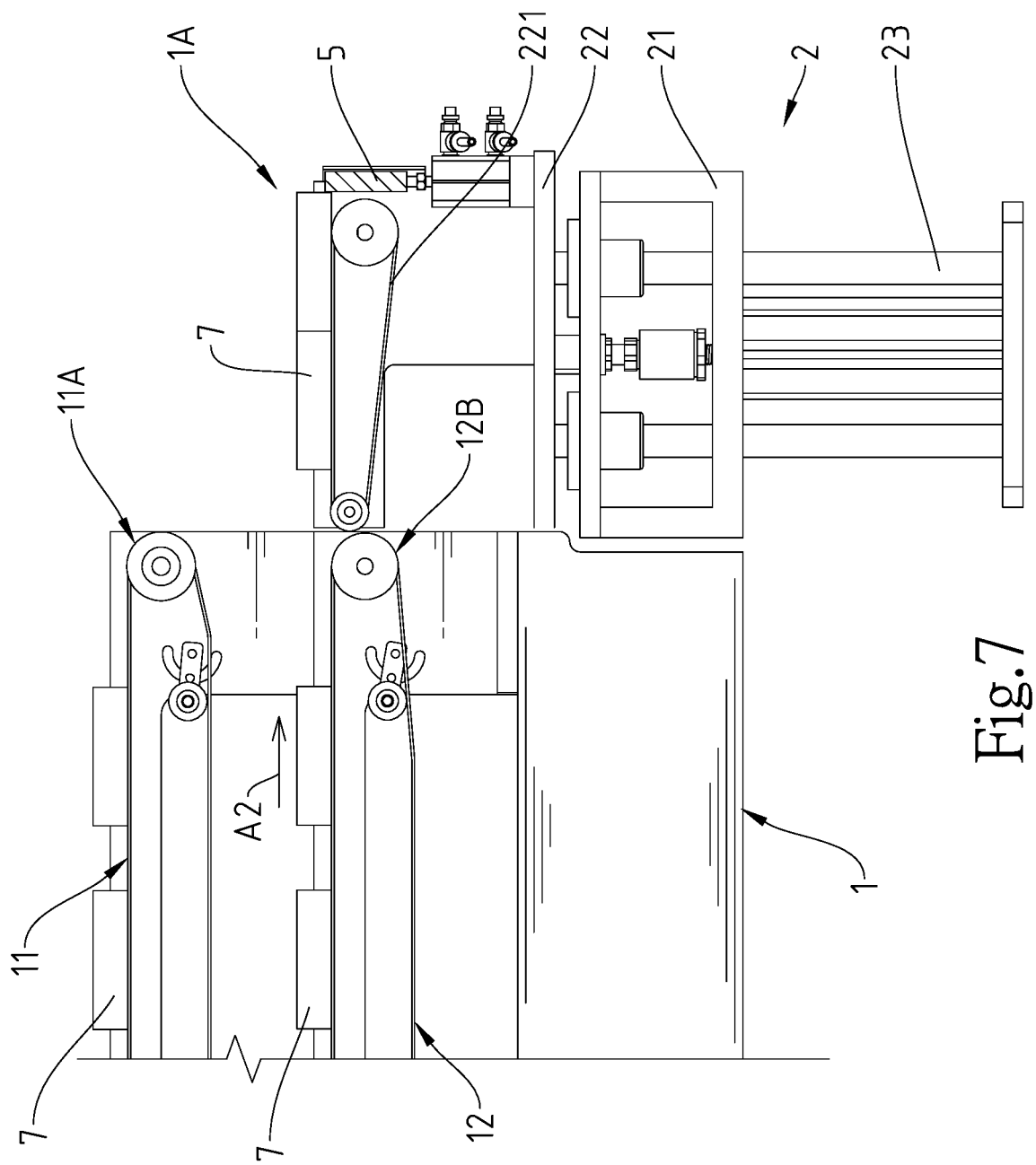
FIG. 7 is a schematic drawing showing the first conveyor module delivered the trays to the second pick-and-place device.

Referring to FIG. 7, basically unused or empty tray (7) is first placed in the second conveyor module (12). The empty tray (7) is discharged through the second discharge end (12B) of the second conveyor module (12). In this state, the first movable seat (22) of the first pick-and-place device (2) moves to the first position (1A).

Figure 8:
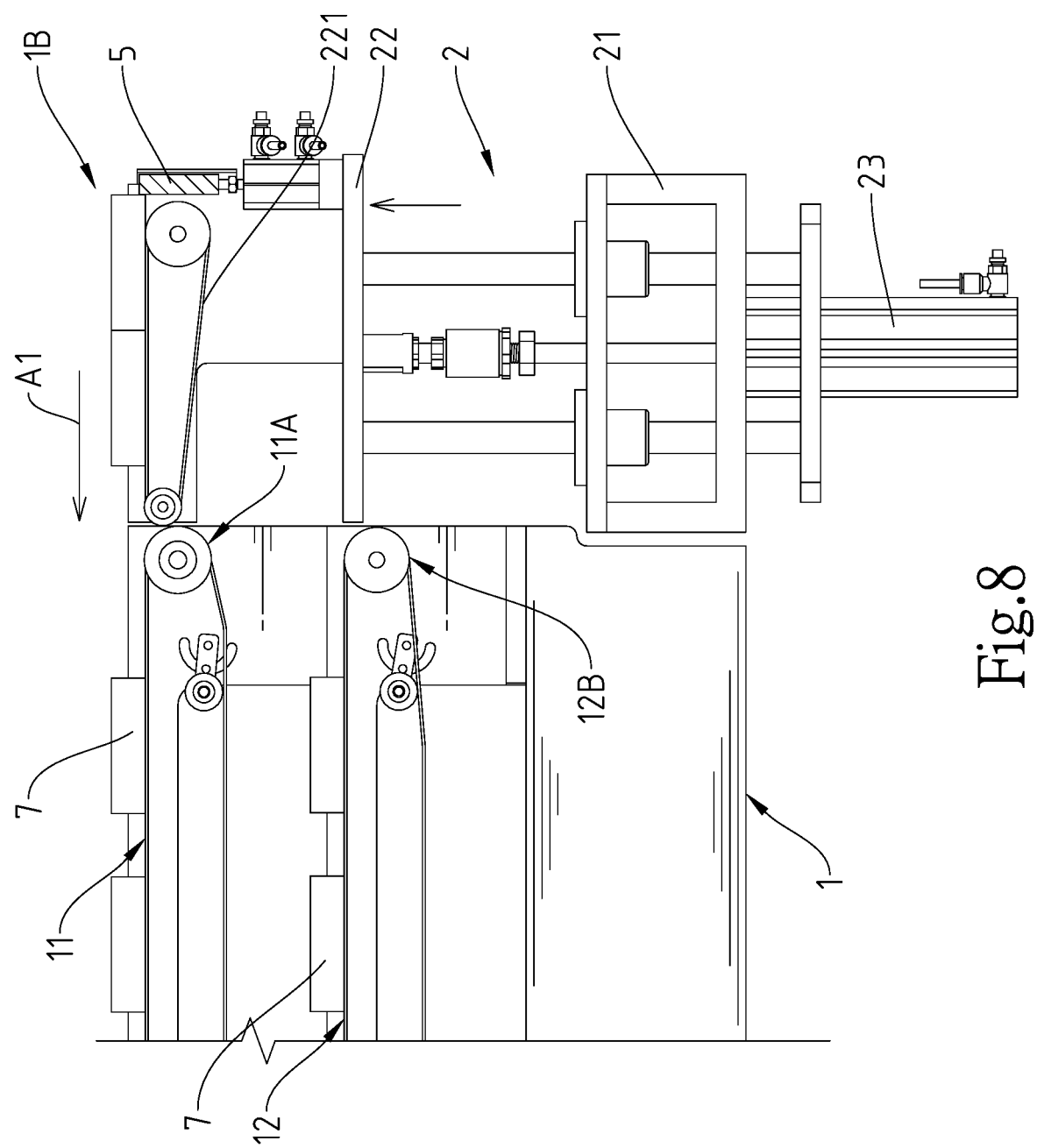
FIG. 8 is a schematic drawing showing the first pick-and-place device delivered the trays to the first conveyor module.

As shown in FIG. 8, the first linear actuator (23) moves the first movable seat (22) toward the second position (1B), and then the first conveyor module (11) carries the tray (7) to the detection device (4) shown in FIG. 4 for detection, and then a cyclic detection and storage operation is performed.

Figure 9:
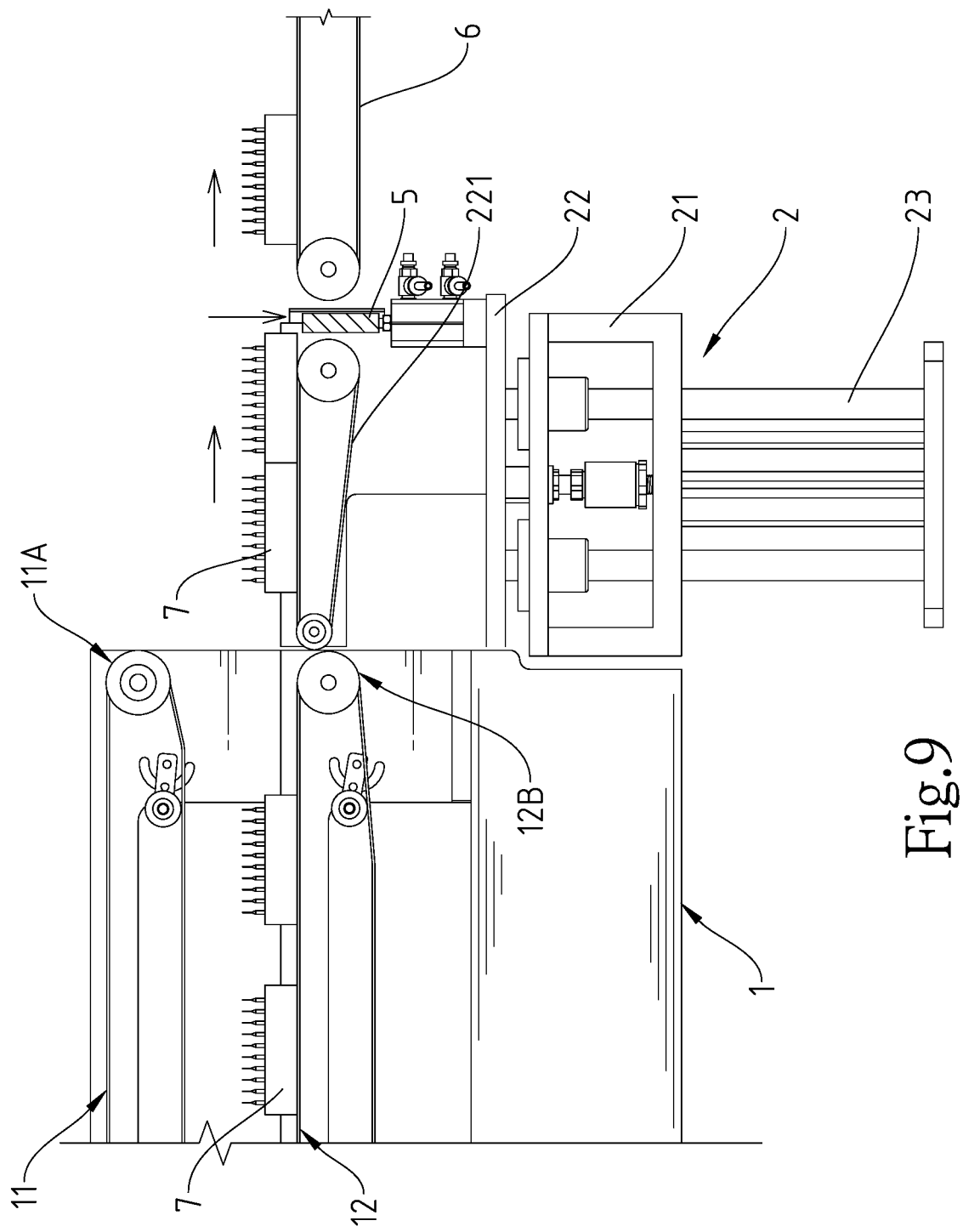
FIG. 9 is a schematic diagram of the operation of replacing the automatic distribution and storage machine of the present invention.

As shown in FIG. 9, the second conveyor module (12) will continuously put the trays (7) to be stored in a storage space (not shown). When the storage space is filled with trays (7), a gate device (5) is used to send the trays (7) from the storage space to another conveyor module (6) for other processing. It can be understood that the present invention can achieve the purpose of full automation.

The structure of the present invention uses the first pick-and-place device (2) and the second pick-and-place device (3) provided on the two opposite lateral sides of the equipment body (1) for continuous detection and storage of trays (7), and the volume of the overall structure is small, which improves the use of space without being limited by the area of the site.

What the invention claimed is:

1. A cyclic type layered storage and output equipment, comprising:

an equipment body comprising a first conveyor module and a second conveyor module, said first conveyor module being used to convey at least one tray, said first conveyor module conveying said at least one tray in a first direction for detection, said second conveyor module conveying said at least one tray in a second direction for storage, said first conveyor module and said second conveyor module being arranged above and below at different elevations, said first direction and said second direction being opposite directions;

at least one first pick-and-place device set at one lateral side of said equipment body, each said first pick-and-place device comprising a first fixed seat, a first movable seat and a first linear actuator, said first fixed seat being affixed to said one lateral side of said equipment body, said first fixed seat and said first movable seat being connected by said first linear actuator, said first linear actuator driving said first movable seat to move linearly relative to said first fixed seat, said first movable seat comprising a first position and a second position, said first position corresponding to a second discharge end of said second conveyor module, said second position corresponding to a first feeding end of said first conveyor module; and at least one second pick-and-place device set an opposite lateral side of said equipment body opposite to said at least one first pick-and-place device, each said second pick-and-place device comprising a second fixed seat, a second movable seat and a second linear actuator, said second fixed seat being affixed to said opposite lateral side of said equipment body opposite to said first pick-and-place device, said second fixed seat and said second movable seat being connected by said second linear actuator, said second linear actuator driving said second movable seat to move linearly relative to said second fixed seat, said second movable seat comprising a third position and a fourth position, said third position corresponding to a first discharge end of said first conveyor module, said fourth position corresponding to a second feeding end of said second conveyor module.

2. The cyclic type layered storage and output equipment as claimed in claim 1, wherein said at least one tray is discharged through said second discharge end of said second conveyor module; said first movable seat of said first pick-and-place device is moved to said first position, and then said first linear actuator drive said first movable seat to move to said second position, and then said first conveyor module carries said at least one tray to a detection device for detection or uses a clamping device to place drill bits in said at least one tray, and then said at least one tray is discharged through said first discharge end of said first conveyor module to said second movable seat of one said second pick-and-place device; said second movable seat is in said third position and uses said second linear actuator to move said second movable seat downward to said fourth position for enabling said second feeding end of said second conveyor module to store said at least one tray.

3. The cyclic type layered storage and output equipment as claimed in claim 1, wherein said at least one tray is used to store drill bits.

4. The cyclic type layered storage and output equipment as claimed in claim 1, wherein said first movable seat and said second movable seat are respectively provided with a conveyor module.

5. The cyclic type layered storage and output equipment as claimed in claim 1, wherein said first linear actuator and said second linear actuator are hydraulic cylinders.

6. The cyclic type layered storage and output equipment as claimed in claim 1, further comprising a gate device and a conveyor module used to deliver the stored said at least one tray to a processing equipment for processing.

* * * * *